United States Patent [19]

Ayervais

[11] Patent Number: 4,612,583

[45] Date of Patent: Sep. 16, 1986

[54] IMAGE ENHANCING TELEVISION ATTACHMENT

[76] Inventor: Michael Ayervais, 235 E. 57th St., New York, N.Y. 10022

[21] Appl. No.: 641,455

[22] Filed: Aug. 16, 1984

[51] Int. Cl.$^4$ ............................................. H04M 5/72
[52] U.S. Cl. ................................... 358/250; 358/255; 353/75; 353/97
[58] Field of Search ............... 358/250, 255, 231, 237; 312/7.2; 362/351, 359, 360; 353/74, 75, 97, 98

[56] References Cited

U.S. PATENT DOCUMENTS

| | | | |
|---|---|---|---|
| 3,773,436 | 5/1973 | Rose | 358/255 |
| 3,849,598 | 11/1974 | Hoffberger et al. | 358/255 |
| 4,097,902 | 6/1978 | Curnuck | 358/255 |

*Primary Examiner*—James J. Groody
*Assistant Examiner*—Edward L. Coles
*Attorney, Agent, or Firm*—Alfred Musumeci

[57] ABSTRACT

An attachment for a television receiver composed of four trapezoidal panels adapted to be attached to the viewing screen of the television set and having reflective or mirrored inner surfaces whereby the image on the television receiver screen is reflected from the reflective surfaces of the four-paneled attachment. Each of the four trapezoidal panels are dimensioned so that when the attachment is mounted on the television receiver, the inner mirrored surfaces of each of the panels will define an included angle with the television screen which is between 100° and 120°.

4 Claims, 2 Drawing Figures

IMAGE ENHANCING TELEVISION ATTACHMENT

The present invention relates generally to an attachment for a television receiver and more particularly to an assembly which will enhance and expand the experience of the viewer when watching a television set.

Although many technological advances have occurred in the development of television generally, the ordinary t.v. receiver has almost always been structured the same; that is, to provide a single picture or single image on the picture tube. Recently, many of the more current developments have involved enhancement of the experience of the viewer insofar as the sound which is emitted from the television set is concerned, but little has been done to expand and enhance the viewing experience from the point of view of the picture itself.

Although many of the newer television receivers are capable of providing a very large picture, this can only be accomplished at great expense and with a receiver which is much larger and more complex since, for example, such receivers are usually of the projection type.

Furthermore, it will be found that advances in the art of t.v. receivers have generally been restricted to the receivers themselves. Little has been done in the way of providing attachments or auxiliary equipment for t.v. sets which can be mounted on the set and removed with ease and which do not involve excessive cost, but which enhance or expand the viewing experience.

Accordingly, the present invention is directed toward providing an attachment for a t.v. receiver which will greatly enhance and expand the experience of the viewer and which will, nevertheless, not involve extensive cost or complexity. Furthermore, the invention provides an attachment which may be utilized with great ease and which may be readily mounted on the t.v. set and easily removed when not in use and conveniently stored.

SUMMARY OF THE INVENTION

Briefly, the present invention may be described as an image enhancing attachment for a television receiver having a viewing screen with a generally planar configuration comprising: four reflective panels each shaped in the form of a trapezoid with a front edge and a rear edge parallel to each other, said front edge being longer than said rear edge, and with a pair of side edges extending between each of said front and rear edges; hinge means attaching each of said reflective panels to two adjacent panels along each of the side edges thereof, said panels being attached so that in their assembled condition, said front edges and said rear edges lie in respective common planes with said front edges and said rear edges arranged to form respective quadrilaterals; means for releasably attaching said assembly panels to said television receiver with said rear edges lying at least in the immediate proximity of the plane of said viewing screen and in general conformity with the outline thereof; said assembled panels being thereby arranged to have inner sides facing inwardly toward said viewing screen; and reflective surface means on each of said inner sides of each of said four panels each reflecting a clear image of said viewing screen; said four reflective panels being dimensioned such that when mounted on a television receiver in said assembled condition, the included angle between the plane of said viewing screen and said inner sides of each of said four panels is between 100° and 120°.

In accordance with a preferred embodiment of the invention, said included angle for each of said four panels is 105°.

The hinge means may comprise elongated plastic members which may be releasably attached along each of the side edges of said panels and by disconnecting one or more of the hinges, the attachment may be folded so as to lie flat for storage.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
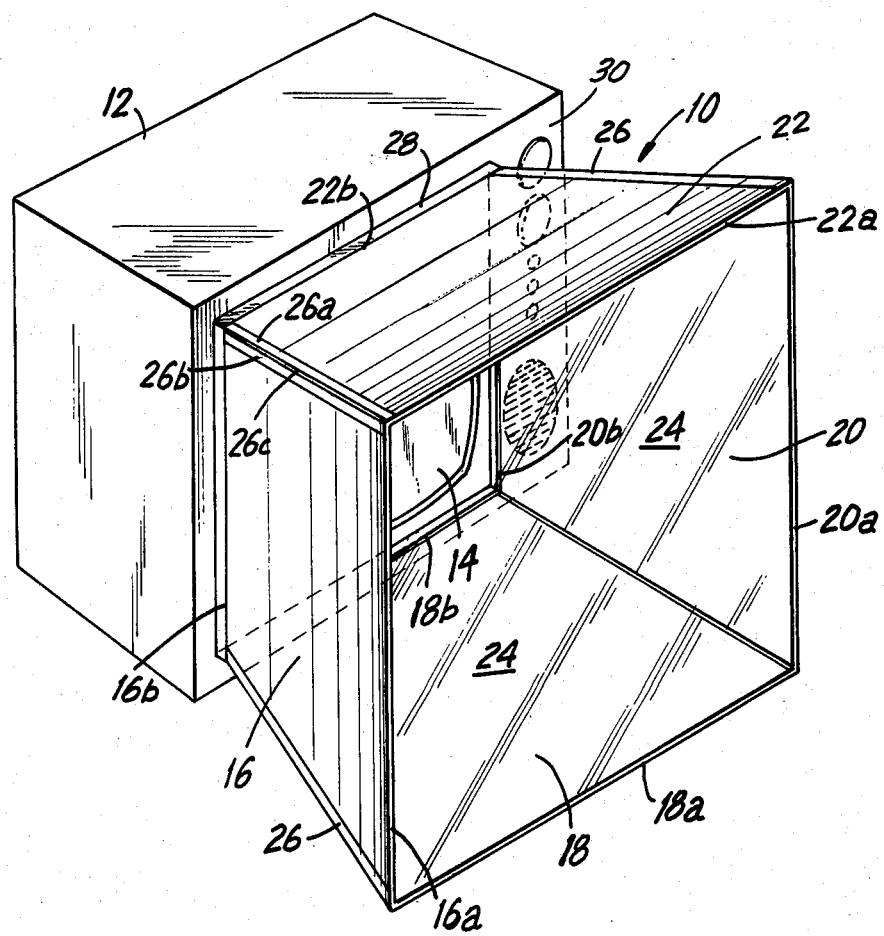
FIG. 1 is a perspective view showing a television receiver with the attachment of the invention mounted thereon.

Referring now to the drawing, FIG. 1 discloses an attachment 10 formed in accordance with the present invention shown in the assembled condition mounted upon a television receiver 12. The television receiver 12 comprises a viewing screen 14 and is a common type of television receiver which is readily commercially available.

The attachment 10 of the present invention consists essentially of four trapezoidal panels 16, 18, 20 and 22 each formed with reflective or mirrored inner surfaces 24.

As will be noted, each of the panels 16–22 has a trapezoidal configuration with each panel having a front edge 16a, 18a, 20a, 22a and a rear edge 16b, 18b, 20b and 22b.

Each of the panels 16–22 is attached to two adjacent panels by hinge means which comprise a plastic hinge member 26 formed with two elongated strips 26a and 26b which are joined together along their edges by a flexible interconnecting web 26c.

Each of the hinges 26 may be releasably affixed to a pair of panels 16–22 by suitable attachment means, such as velcro tape which may be provided between the outer surfaces of the panels along their edges and the inner surfaces of the strips 26a, 26b.

Alternatively, only one of the hinges 26 may be provided with releasable securing means and by releasing one of the hinges 26, the four panels may be folded flat when they are removed from the television receiver 12.

In order to attach the assembled panels to the receiver 12, there is provided a frame 28 which extends about the inner edges 16b–22b of the assembled attachment and which frame 28 is adapted to be pressed flat against the front surface 30 of the t.v. receiver and connected thereto by suitable means, such as velcro tape. As will be apparent to those skilled in the art, the velcro tape may be in two parts with one part being attached to the front face 30 of the television set and with another part being attached to the frame 28 so that the frame 28 may be readily mounted and dismounted from the front face of the television set.

FIG. 1 shows the attachment 10 in the assembled condition on the television receiver 12. The frame 28 is mounted flush with the front face 30 of the receiver 12 and the inner edges 16b–22b lie at least approximately within the plane of the viewing screen 14 of the television receiver 12 and extend in general conformity with the outline of the screen.

As a result, a viewer standing in front of the television set viewing the screen 14 will see the image on the screen 14 reflected from each of the inner surfaces 24 of the four panels 16–22.

As a result, a greatly enhanced viewing experience will be provided in that the image on the screen 14 will be reflected from four different panels in a particular manner.

The inner surfaces or sides 24 of the panels 16–22 should be of a fairly high reflective characteristic similar to or simulating a mirror.

In accordance with a specific aspect of the invention, the experience of the viewer is particularly enhanced by positioning the panels 16–22 relative to the screen 14 at specific angles of inclination.

Figure 2:
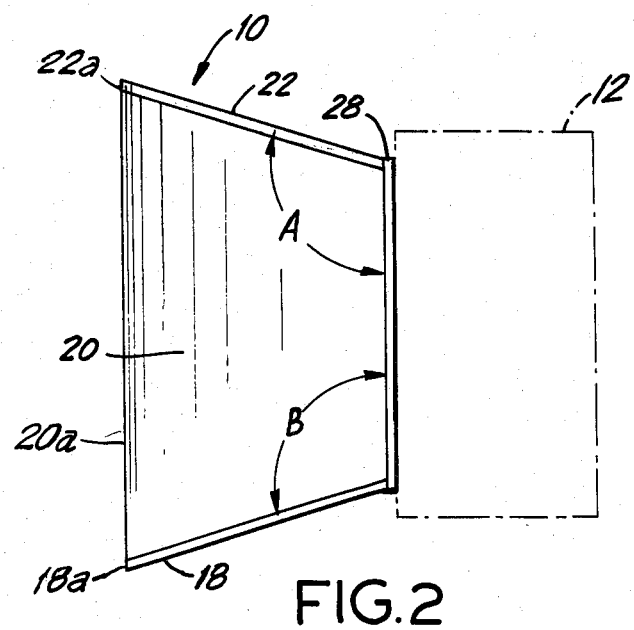
FIG. 2 is a schematic side view depicting the relative angular positioning of the panels of the attachment.

As will be seen in FIG. 2, the bottom panel 18 and the top panel 22 are shown as defining included angles A and B with the screen 14. The side panels 16 and 20 will, of course, define similar angles and in accordance with the present invention each of the included angles between the inner surfaces 24 of the panels 16–22 and the plane of the screen 14 is between 100° and 120°. It has been found that these specific angular limitations will provide an especially advantageous viewing experience and will uniquely enhance the experience of the viewer when watching the television set.

Of course, it will be understood that the included angles between the panels 16 and 20 will be also between 100° and 120° just as the included angles A and B.

In a preferred embodiment of the invention, each of the included angles between each of the panels 16–22 and the screen 14 is 105°.

As will be noted, when the attachment 10 is in the assembled and mounted condition, the front edges 16a–22a thereof will all lie in a common plane and will define a quadrilateral. Similarly, the rear edges 16b–22b will also define a quadrilateral and, as will be noted from the drawing, the front edges 16a–22a are in each case longer than the rear edges 16b–22b. Each of the panels is joined along its side edges with a side edge of a next adjacent panel and as will be apparent from the drawings the entire assembly 10 may be easily mounted upon the t.v. receiver 12 and dismounted therefrom merely by attaching the frame 28 and detaching the frame from the front face 30 of the set.

Of course, it will be apparent that the dimensions of the individual panels 16–22 may be made in accordance with the size of the television receiver 12 and the size of the screen 14, but the critical limitation of the present invention involves the included angles between the panels 16–22 and the screen which, as previously indicated, must be maintained within the limitations set forth with four panels being provided for the attachment in order to produce the intended results.

While a specific embodiment of the invention has been shown and described in detail to illustrate the application of the inventive principles thereof, it will be understood that the invention may be embodied otherwise without departing from such principles.

What is claimed is:

1. An image enhancing attachment for a television receiver having a viewing screen with a generally planar configuration comprising:

four reflective panels each shaped in the form of a trapezoid with a front edge and a rear edge parallel to each other, said front edge being longer than said rear edge, and with a pair of side edges extending between each of said front and rear edges;

hinge means attaching each of said reflective panels to two adjacent panels along said side edges thereof, said panels being attached so that in their assembled condition said front edges and said rear edges lie in respective common planes with said front edges and said rear edges arranged to form respective quadrilaterals;

means for releasably attaching said assembled panels to said television receiver with said rear edges lying at least in the immediate vicinity of the plane of said viewing screen and in general conformity with the outline thereof;

said assembled panels being arranged to have inner sides facing inwardly toward said viewing screen; and reflective surface means extending entirely over each of said inner sides of each of said four panels each reflecting a clear image of said viewing screen;

said four reflective panels each being dimensioned such that when mounted on a television receiver in said assembled condition an included angle between the plane of said viewing screen and said inner sides of each of said four panels is between 100° and 120°.

2. An attachment according to claim 1, wherein said included angle for each of said panels is 105°.

3. An attachment according to claim 1, wherein said hinge means comprise four elongated plastic hinges each formed with a pair of longitudinal panels joined together by a flexible web, with at least one of said hinges being releasably attached between a pair of said panels.

4. An attachment according to claim 1, further comprising a frame extending about said reflective panels immediately adjacent said rear edges thereof, said frame being with a quadrilateral configuration identical with the quadrilateral formed by said rear edges and being adapted to be releasably attached to said television receiver.

* * * * *